(12) United States Patent
Nambisan et al.

(10) Patent No.: US 7,515,544 B2
(45) Date of Patent: Apr. 7, 2009

(54) METHOD AND SYSTEM FOR PROVIDING LOCATION-BASED ADDRESSING

(75) Inventors: Dinesh Nambisan, Fremont, CA (US); Ian Sayers, Redwood City, CA (US)

(73) Assignee: Tadaaki Chigusa, Tokyo (JP)

( * ) Notice: Subject to any disclaimer, the term of this patent is extended or adjusted under 35 U.S.C. 154(b) by 680 days.

(21) Appl. No.: 11/181,619

(22) Filed: Jul. 14, 2005

(65) Prior Publication Data
US 2007/0025353 A1    Feb. 1, 2007

(51) Int. Cl.
G01R 31/08 (2006.01)
H04L 12/28 (2006.01)
(52) U.S. Cl. .................................. 370/238; 370/400
(58) Field of Classification Search ............... None
See application file for complete search history.

(56) References Cited

U.S. PATENT DOCUMENTS

| | | |
|---|---|---|
| 4,062,015 A | 12/1977 | Litva |
| 4,114,157 A | 9/1978 | Hirata |
| 4,835,463 A | 5/1989 | Baran et al. |
| 4,929,958 A | 5/1990 | Hodal |
| 4,939,726 A | 7/1990 | Flammer et al. |
| 5,007,052 A | 4/1991 | Flammer |
| 5,075,696 A | 12/1991 | Wilby |
| 5,079,768 A | 1/1992 | Flammer |
| 5,095,535 A | 3/1992 | Freeburg |
| 5,115,433 A | 5/1992 | Baran et al. |
| 5,130,987 A | 7/1992 | Flammer |
| 5,223,790 A | 6/1993 | Baran et al. |
| 5,243,536 A | 9/1993 | Bradford |
| 5,338,332 A | 8/1994 | Baran et al. |
| 5,365,516 A | 11/1994 | Jandrell |
| 5,400,338 A | 3/1995 | Flammer, III |
| 5,406,249 A | 4/1995 | Pettus |
| 5,412,654 A | 5/1995 | Perkins |
| 5,453,977 A | 9/1995 | Flammer, III et al. |

(Continued)

FOREIGN PATENT DOCUMENTS

EP    0789468 A1    8/1997

(Continued)

OTHER PUBLICATIONS

Machine Translation of Abstract of JP 11-239154, no date, 1 page, Japan.

(Continued)

Primary Examiner—Wing F Chan
Assistant Examiner—Eunsook Choi

(57) ABSTRACT

A system for identifying an optimal route in a network is disclosed. The system includes a destination node having an associated node address, a source node having an associated node address, and a number of intermediate nodes each having an associated node address. The intermediate nodes include a number of neighboring nodes associated with the source node. The source node is configured to select one or more of the neighboring nodes to receive a route request. The selection of the selected one or more neighboring nodes is based on the location information associated with the destination node and the selected one or more neighboring nodes. One or more of the selected one or more neighboring nodes propagate their route requests received from the source node to the destination node along one or more routes.

89 Claims, 6 Drawing Sheets

U.S. PATENT DOCUMENTS

| | | | |
|---|---|---|---|
| 5,465,398 A | 11/1995 | Flammer | |
| 5,471,469 A | 11/1995 | Flammer, III et al. | |
| 5,479,176 A | 12/1995 | Zavrel, Jr. | |
| 5,479,400 A | 12/1995 | Dilworth et al. | |
| 5,485,393 A | 1/1996 | Bradford | |
| 5,488,608 A | 1/1996 | Flammer, III | |
| 5,515,369 A | 5/1996 | Flammer, III et al. | |
| 5,526,357 A | 6/1996 | Jandrell | |
| 5,570,084 A | 10/1996 | Ritter et al. | |
| 5,636,216 A | 6/1997 | Fox et al. | |
| 5,664,194 A | 9/1997 | Paulsen | |
| 5,703,602 A | 12/1997 | Casebolt | |
| 5,736,959 A | 4/1998 | Patterson | |
| 5,745,483 A | 4/1998 | Nakagawa et al. | |
| 5,745,884 A | 4/1998 | Carnegie | |
| 5,764,487 A | 6/1998 | Natsume | |
| 5,767,807 A | 6/1998 | Pritchett | |
| 5,774,344 A | 6/1998 | Casebolt | |
| 5,787,077 A | 7/1998 | Kuehnel | |
| 5,793,842 A | 8/1998 | Schloemer | |
| 5,802,447 A | 9/1998 | Miyazaki | |
| 5,818,828 A | 10/1998 | Packer et al. | |
| 5,892,908 A | 4/1999 | Hughes | |
| 5,901,143 A | 5/1999 | Rotter | |
| 5,903,566 A | 5/1999 | Flammer, III | |
| 5,946,615 A | 8/1999 | Holmes et al. | |
| 6,026,303 A | 2/2000 | Minamisawa | |
| 6,028,853 A | 2/2000 | Haartsen | |
| 6,041,232 A | 3/2000 | Jennings, III | |
| 6,049,593 A | 4/2000 | Acampora | |
| 6,072,994 A | 6/2000 | Phillips | |
| 6,104,712 A | 8/2000 | Robert et al. | |
| 6,160,647 A | 12/2000 | Gilliland | |
| 6,173,191 B1 | 1/2001 | Jennings, III | |
| 6,192,230 B1 | 2/2001 | van Bokhorst et al. | |
| 6,198,728 B1 | 3/2001 | Hulyalkar | |
| 6,298,053 B1 | 10/2001 | Flammer, III et al. | |
| 6,304,556 B1 | 10/2001 | Haas | |
| 6,307,843 B1 | 10/2001 | Okanoue | |
| 6,314,163 B1 | 11/2001 | Acampora | |
| 6,327,918 B1 | 12/2001 | Lawless | |
| 6,329,902 B1 | 12/2001 | Lee et al. | |
| 6,330,438 B1 | 12/2001 | McClelland | |
| 6,349,206 B1 | 2/2002 | Reichelt | |
| 6,430,395 B2 | 8/2002 | Arazi | |
| 6,456,675 B2 | 9/2002 | Wagner | |
| 6,522,881 B1 | 2/2003 | Feder | |
| 6,580,700 B1 | 6/2003 | Pinard | |
| 6,590,928 B1 | 7/2003 | Haartsen | |
| 6,728,554 B1 | 4/2004 | Wegner | |
| 6,801,790 B2 | 10/2004 | Rudrapatna | |
| 6,816,706 B1 | 11/2004 | Hohnstein | |
| 6,888,811 B2 | 5/2005 | Eaton | |
| 7,015,809 B1 | 3/2006 | Sayers | |
| 7,042,394 B2 | 5/2006 | Sayers | |
| 7,221,268 B2 | 5/2007 | Sayers | |
| 7,280,073 B2 | 10/2007 | Sayers | |
| 2001/0002908 A1 | 6/2001 | Rune et al. | |
| 2001/0003191 A1 | 6/2001 | Kovacs et al. | |
| 2001/0005368 A1 | 6/2001 | Rune | |
| 2001/0012757 A1 | 8/2001 | Boyle | |
| 2001/0013856 A1 | 8/2001 | Hamakada et al. | |
| 2001/0016909 A1 | 8/2001 | Gehrmann | |
| 2001/0018336 A1 | 8/2001 | Okajima et al. | |
| 2001/0022780 A1 | 9/2001 | Mizutani et al. | |
| 2001/0024443 A1 | 9/2001 | Alriksson et al. | |
| 2001/0029166 A1 | 10/2001 | Rune et al. | |
| 2001/0031626 A1 | 10/2001 | Lindskog et al. | |
| 2001/0033248 A1 | 10/2001 | Owechko | |
| 2001/0033556 A1 | 10/2001 | Krishnamurthy et al. | |
| 2001/0045914 A1 | 11/2001 | Bunker | |
| 2001/0049295 A1 | 12/2001 | Matsuoka | |
| 2002/0004817 A1 | 1/2002 | Pham et al. | |
| 2002/0016838 A1 | 2/2002 | Geluc et al. | |
| 2002/0018448 A1 | 2/2002 | Amis et al. | |
| 2002/0054572 A1 | 5/2002 | Saleh | |
| 2002/0054575 A1 | 5/2002 | Cho | |
| 2003/0038747 A1 | 2/2003 | Patel | |
| 2003/0087650 A1 | 5/2003 | Aarnio | |
| 2003/0117966 A1* | 6/2003 | Chen | 370/255 |
| 2003/0161268 A1 | 8/2003 | Larsson | |
| 2004/0131025 A1* | 7/2004 | Dohler et al. | 370/328 |
| 2004/0146007 A1* | 7/2004 | Saadawi et al. | 370/238 |
| 2004/0223476 A1 | 11/2004 | Jose | |
| 2004/0233882 A1* | 11/2004 | Park et al. | 370/338 |
| 2005/0018645 A1* | 1/2005 | Mustonen et al. | 370/349 |
| 2005/0169238 A1* | 8/2005 | Yang et al. | 370/351 |
| 2005/0277808 A1 | 12/2005 | Sonnenschein | |
| 2006/0071853 A1* | 4/2006 | Sayers | 342/432 |
| 2006/0293061 A1* | 12/2006 | Kobayashi et al. | 455/455 |
| 2007/0002551 A1 | 1/2007 | Ger | |
| 2007/0109980 A1 | 5/2007 | Awater | |
| 2007/0286097 A1* | 12/2007 | Davies | 370/255 |
| 2008/0170550 A1* | 7/2008 | Liu et al. | 370/338 |

FOREIGN PATENT DOCUMENTS

| | | |
|---|---|---|
| EP | 0852407 A2 | 8/1998 |
| EP | 1202389 A1 | 5/2002 |
| JP | 09-083528 | 3/1997 |
| JP | 11-239154 | 8/1999 |
| WO | 95/28780 A1 | 10/1995 |
| WO | WO 95/28780 A1 | 10/1995 |
| WO | 96/00468 A1 | 1/1996 |
| WO | WO 96/00468 A1 | 1/1996 |
| WO | 97/09673 A1 | 3/1997 |
| WO | WO 97/09673 A1 | 3/1997 |
| WO | 00/16508 A1 | 3/2000 |
| WO | 01/26328 A2 | 4/2001 |
| WO | WO-01/26328 A2 | 4/2001 |
| WO | 01/86850 A1 | 11/2001 |
| WO | WO 01/86850 A1 | 11/2001 |
| WO | 02/19740 A1 | 3/2002 |
| WO | WO 02/19740 A1 | 3/2002 |
| WO | 2004/040692 A1 | 5/2004 |
| WO | 2005/074197 A1 | 8/2005 |
| WO | WO-2005/074197 A1 | 8/2005 |

OTHER PUBLICATIONS

Machine Translation of Abstract of JP 09-083528, no date, 1 page, Japan.

IEEE Std 802.11, 1999/8802-11 (ISO/IEC 8802-11:1999) Std for Info Technology—LAN/MAN—Specific requirements—Part 11: Wireless LAN (MAC) and PHY Specs, IEEE NY, NY (528 pages).

IEEE Std 802.11B-1999 Std for Telecomm and Info Exchange Between Systems—LAN/MAN Specific Requirements—Part 11: Wireless (MAC) & PHY Specs: 2.4 GHz Band, IEEE NY, NY (96 pages).

IEEE Std 802.16-2001 Std for Local and Metropolitan Area Netwks Part 16: Air Interface for Fixed Broadband Wireless Access Systems, IEEE 3 Park Avenue, New York, NY 10016-5997 (349 pages).

"3GPP TS 23.107 v6.3.0 Technical Specification Group Services and System Aspects; Quality of Service (QoS) concept and architecture (Release 6)," 3GPP Generation Partnership Project, Jun. 2005 (2005-2006), XP002354258 (40 pages).

"Digital cellular telecommunications system (Phase 2+); Universal Mobile Telecommunications System (UMTS); End-to-end Quality of Service (QoS) concept and architecture (3GPP TS 23.207 version 5.9.0 Release 5); ETSI TS 123207," ETSI Standards, European Telecommunications Standards Institute, Sophia-Antipo, FR, vol. 3-SA2, No. V590, Mar. 2004, XP0104016491 ISSN: 0000-0001 (48 pages).

PCT "Notification Concerning Transmittal of International Preliminary Report on Patentability", Int'l Search Authority, Int'l patent application PCT/US06/26552 dated Jan. 24, 2008 (6 pages).

PCT "Written Opinion" for PCT/US03/23623 dated May 24, 2004 (7 pages).
PCT "Notification of Transmital of the International Search Report or the Declaration" for PCT/US03/23623 dated Mar. 5, 2004 (6 pages).
PCT "Notification of Transmittal of International Preliminary Examination Report" for PCT/US03/23623 dated Mar. 17, 2005 (8 pages).
EPO "Extended European Search Report" for EP 05254384.0•2411 dated Dec. 8, 2005 (9 pages).
EPO "European Search Report" for EP 05254384.0•2411 dated Aug. 9, 2007 (9 pages).

EPO "Extended European Search Report" for EP 05254385.7-2411 dated Dec. 27, 2005 (8 pages).
EPO "Extended European Search Report" for EP 05254385.7-2411 dated Aug. 17, 2007 (8 pages).
PCT "Notification of Transmittal of the International Search Report and the Written Opinion of the International Searching Authority", Int'l Search Authority, Int'l patent application PCT/US06/26552 dated Feb. 5, 2007 (11 pages).

* cited by examiner

| ASCII Data | Meaning |
|---|---|
| 4807.038,N | Latitude 48 deg 07.038' N |
| 01131.324,E | Longitude 11 deg 31.324' E |

FIG. 3

| Byte | Bit | | | | | | | | |
|------|-----|---|---|---|---|---|---|---|---|
| | | 0 | 1 | 2 | 3 | 4 | 5 | 6 | 7 |
| 0 | Latitude Bits | AD0 | OD0 | AD1 | OD1 | AD2 | OD2 | AD3 | OD3 |
| 1 | | AD4 | OD4 | AD5 | OD5 | AD6 | OD6 | AD7 | OD7 |
| 2 | | AM0 | OM0 | AM1 | OM1 | AM2 | OM2 | AM3 | OM3 |
| 3 | | AM4 | OM4 | AM5 | OM5 | AS6 | OS6 | AS7 | OS7 |
| 0 | Longitude Bits | AS2 | OS2 | AS3 | OS3 | AS4 | OS4 | AS5 | OS5 |
| 1 | | AS6 | OS6 | AS7 | OS7 | AS8 | OS8 | AS9 | N |
| 2 | | E | | | | | | | |

LATITUDE BITS
ADn = Latitude Degrees bits
AMn = Latitude Minutes bits
ASn = Latitude Seconds bits LONGITUDE BITS
ODn = Longitude Degrees bits
OMn = Longitude Minutes bits
OSn = Longitude Seconds bits

FIG. 4

METHOD AND SYSTEM FOR PROVIDING LOCATION-BASED ADDRESSING

CROSS-REFERENCE(S) TO RELATED APPLICATION(S)

Not Applicable.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

The present invention generally relates to network routing and, in particular, to methods and systems that are capable of providing efficient network routing using location-based addressing.

Routing information for a destination node in a computer network may generally be obtained in a number of ways. In one arrangement known as direct source routing, each node contains an address table which contains routing information for various other nodes in the network. A look-up operation can be performed on the address table to retrieve the appropriate routing information for a destination node. While look-up operations performed on the address table are relatively fast, maintaining the address table often becomes burdensome. For example, in a network containing a large number of nodes, storing routing information for each and every node in a single address table in each node consumes a very large amount of memory capacity. Furthermore, updating an address table also becomes problematic as frequent updates may need to be propagated to all the nodes to keep their address tables current.

In another arrangement, when a source node needs to identify the routing information for a destination node, the source node broadcasts messages to all its neighboring nodes to seek such information. If a neighboring node does not have the sought-after routing information, the neighboring node in turn broadcasts its own messages to its neighboring nodes seeking the routing information for the destination node. In this manner, the nodes essentially contact each other until the sought-after routing information for the destination node is obtained. The appropriate routing information is then relayed back to the source node to allow data to be sent to the destination node. The foregoing may be viable within a network which contains a relatively small number of nodes. However, as the number of nodes in the network increases, it can be easily seen that the number of broadcast messages collectively issued by all the nodes may become unmanageably large, thereby unnecessarily consuming bandwidth and flooding the network. Clearly, if the network is flooded with routing messages, it would become impossible for that network to effectively carry any useful user data.

Hence, it would be desirable to provide methods and systems that are capable of, amongst other things, providing routing information in a network in an efficient manner.

SUMMARY OF THE INVENTION

In one embodiment, a system for identifying an optimal route in a network is disclosed. The system includes a destination node having an associated node address, a source node having an associated node address, and a plurality of intermediate nodes each having an associated node address. The address associated with each node is assumed to be unique. The plurality of intermediate nodes include a plurality of neighboring nodes associated with the source node. The node addresses associated respectively with the destination node and the plurality of intermediate nodes include location information associated respectively with the destination node and the plurality of intermediate nodes. The source node is configured to select one or more of the plurality of neighboring nodes to receive a route request. The selection of one or more neighboring nodes is based on the location information associated with the destination node. One or more of the selected one or more neighboring nodes propagate their route requests received from the source node to the destination node along one or more routes. Each of the one or more routes includes one or more of the plurality of intermediate nodes. The destination node is configured to receive the route requests propagated by one or more of the selected one or more neighboring nodes, the route requests respectively identifying one or more routes. The destination node then uses information from the one or more received route requests to select the optimal route.

In one aspect, a method for identifying an optimal route in a network is disclosed. The network includes a destination node having an associated node address, a source node having an associated node address and a plurality of intermediate nodes each having an associated node address. The plurality of intermediate nodes include a plurality of neighboring nodes associated with the source node. The node addresses associated respectively with the destination node and the plurality of intermediate nodes include location information associated respectively with the destination node and the plurality of intermediate nodes. According to the method, the source node is directed to select one or more of the plurality of neighboring nodes to receive a route request. The selection of one or more neighboring nodes is based on the location information associated with the destination node and the selected one or more neighboring nodes. One or more of the selected one or more neighboring nodes are then directed to propagate their route requests received from the source node to the destination node along one or more routes. Each of the one or more routes includes one or more of the plurality of intermediate nodes. The destination node is directed to receive the route requests propagated by one or more of the selected one or more neighboring nodes, the route requests respectively identifying the one or more routes, and select the optimal route from the one or more routes based on the received route requests.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings:

FIG. 3 is a table illustrating longitudinal and latitudinal information provided by a global positioning system;

FIG. 4 is an illustrative diagram showing the binary representation of a 64-bit suffix of an IPv6 address according to one embodiment of the present invention.

DETAILED DESCRIPTION OF SPECIFIC EMBODIMENTS

Figure 1:
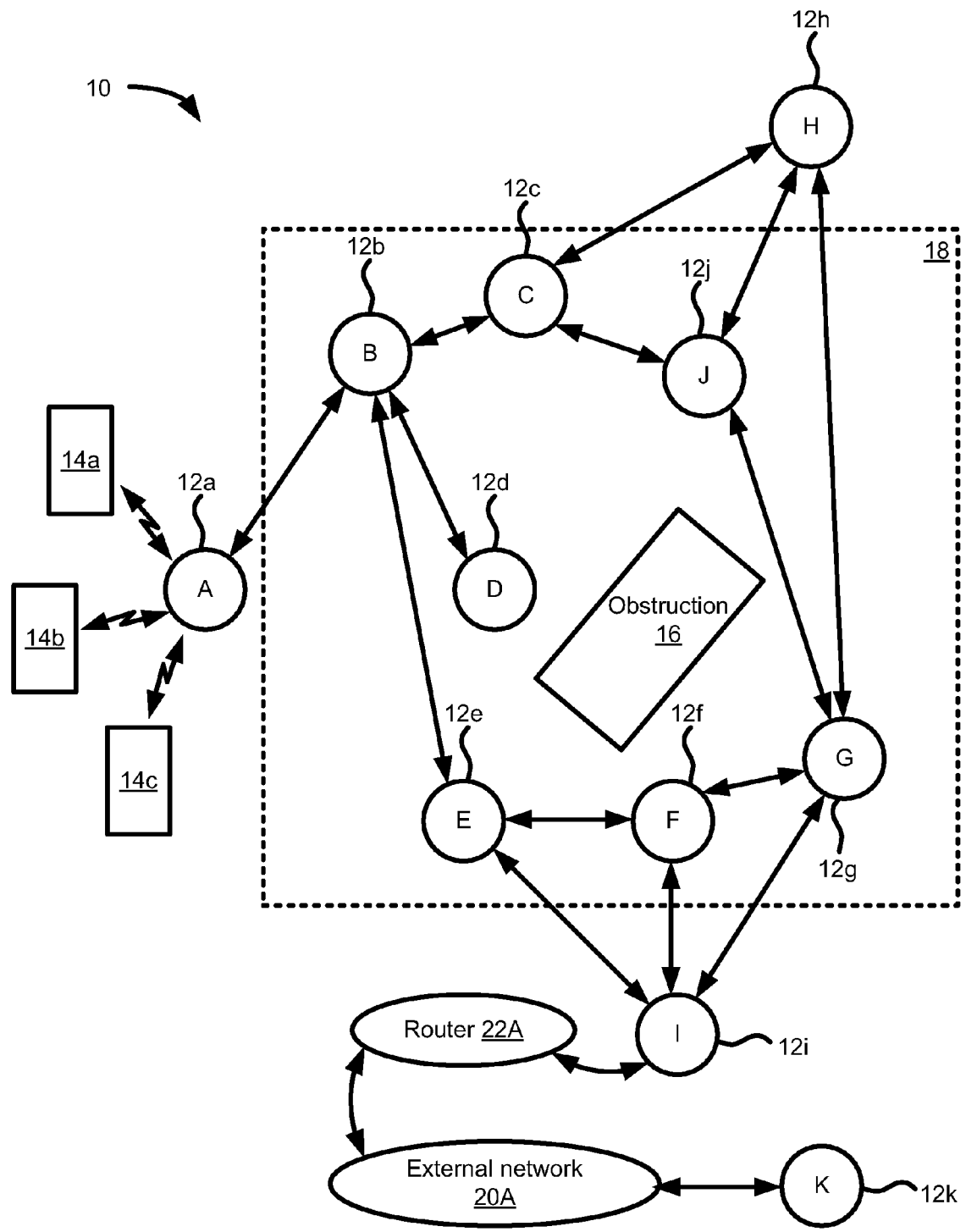
FIG. 1 is a simplified schematic diagram illustrating a network configuration that may be used to practice the present invention.

One or more embodiments of the present invention will now be described. FIG. 1 is a network 10 that may be used to practice the present invention. In one implementation, the network 10 may include a number of nodes 12a-j. These nodes 12a-j are peers to each other, i.e., the network 10 has a peer-to-peer configuration. Each node 12a-j may be further configured to accommodate a number of mobile units 14a-c. The mobile units 14a-c may communicate with a node, e.g., node 12a, to carry out one or more functions. For example, the mobile unit 14a-c may be a mobile phone communicating with the node 12a to retrieve data or messages. The network 10 may be a radio network in which communications between nodes 12a-j are conducted via wireless, radio frequencies. Based on the disclosure and teachings provided herein, it will be appreciated by a person skilled in the art that other types of network may be used to practice the present invention.

Figure 2:
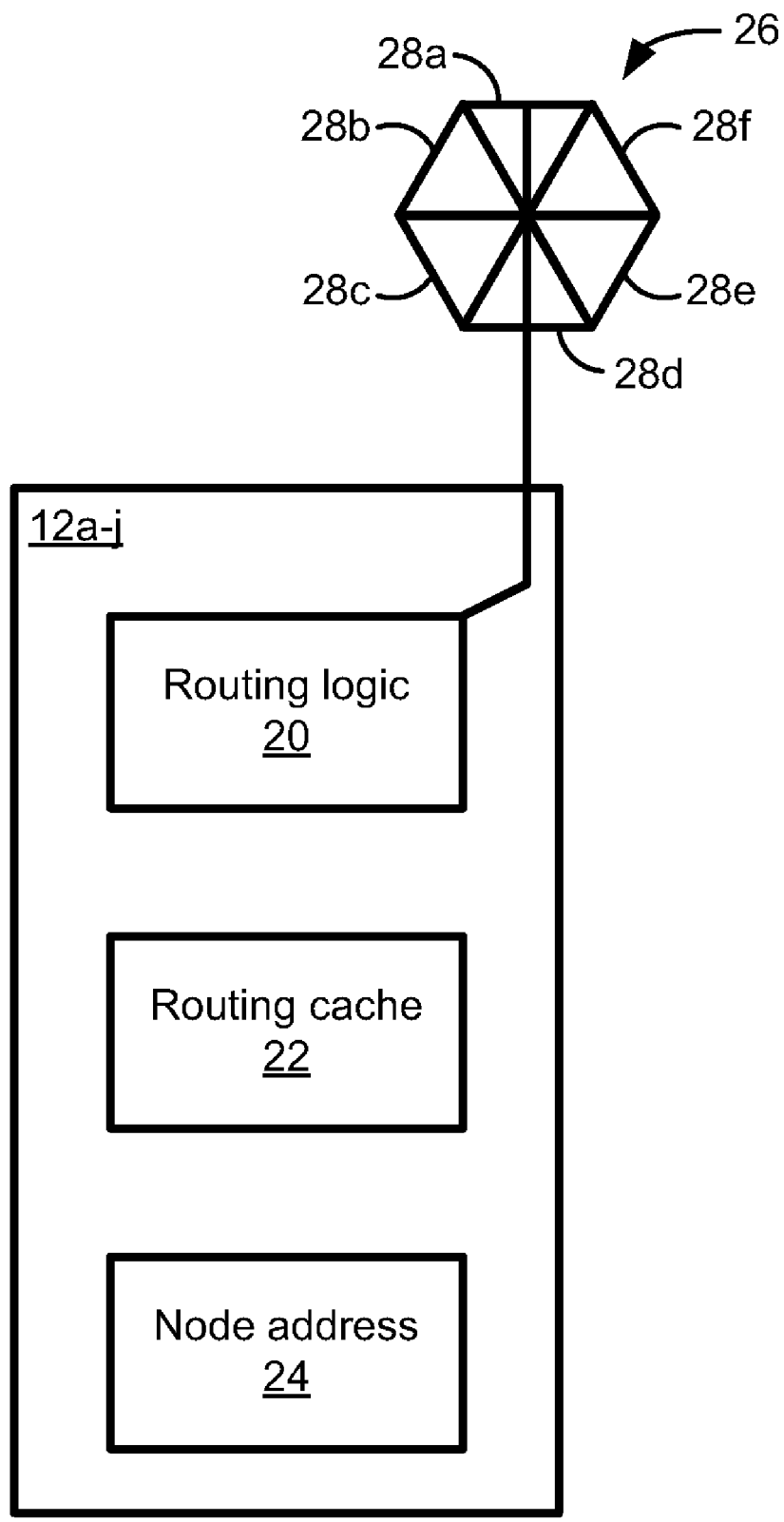
FIG. 2 is a simplified schematic diagram illustrating some of the components of a node shown in FIG. 1 according to an embodiment of the present invention.

As shown in FIG. 2, each node 12a-j may further include routing logic 20, a route cache 22, and a node address 24. The routing logic 20 controls the routing functions performed by the node 12a-j. The routing logic 20 may be implemented in software, hardware or a combination of both. The route cache 22 is used to store routing information relative to other nodes 12a-j. The node address 24 is used to uniquely identify each node 12a-j. As will be further described below, the node address 24 for each node 12a-j may be used to facilitate communications between nodes 12a-j within the network 10 or to mobile devices 14a-c. Each node 12a-j may further include a transceiver 26.

The transceiver 26 may be used to communicate with other nodes using radio frequencies. The transceiver 26 may be made up of a number of transmission antennas 28a-f. Each of the transmission antennas 28a-f may be switched on and off independently for transmission. Furthermore, each of the transmission antennas 28a-f may be used independently to perform respective functions. For example, the transmission antenna 28a may be used to download data to a mobile unit 14a-c while another transmission antenna 28e may be used to upload data from the mobile unit 14a-c to the node 12a. The transmission antennas 28a-f may be further made up of a number of antenna panels or parasitic elements.

In one implementation, the node address 24 is an IPv6 address that is one hundred and twenty-eight (128) bits long. IPv6 corresponds to Internet Protocol version 6. The network 10 may be assigned a/48 prefix from the IPv6 addressing domain. This address range can theoretically support trillions ($2^{80}$) of IPv6 nodes/interfaces. Furthermore, each node 12a-j may be assigned a subnet of two hundred and fifty-four (254) host addresses Some of the subnet host addresses can be assigned to the mobile units 14a-c, thereby bestowing location-based addresses to the mobile units 14a-c. The first address within the subnet is used to identify the node itself. The node address 24 for each node 12a-j includes specific location information relative to that node 12a-j and a net mask. The specific location information may be encoded using a 64-bit suffix of the IPv6 address. The net mask will be further described below.

The location information may include longitudinal and latitudinal information relative to the corresponding node. The longitudinal and latitudinal information may be referred to as location coordinates. The longitudinal and latitudinal information may be obtained from a global positioning system (GPS) (not shown) or other means, including but not limited to, GIS (geographic information system) databases. The node 12a-j may include logic (not shown) that is configured to communicate with the GPS. Other ways are available to provide the longitudinal and latitudinal information to the node 12a-j. For example, the longitudinal and latitudinal information may be uploaded to the node 12a-j from another system or device. The longitudinal and latitudinal information is encoded as the location information which is included as part of the node address 24. Although longitude and latitude are used herein to illustrate one embodiment of the present invention, so long as the node address has some location awareness, other schemes with similar properties could be developed by those ordinarily skilled in the art.

The longitudinal and latitudinal information provided by the GPS is usually encoded in ASCII or NEMA format. An example of an ASCII format is shown in FIG. 3. As shown in FIG. 3, the first two (2) digits of the latitude value indicate the degrees, up to a maximum value of ninety (90), with the north/south flag changing that value from +90 to −90. The next two digits of the latitude value indicate the minutes, with the digits after the decimal indicating seconds (mapped to a resolution of 1000, such that every additional 16.667=1 second). Similarly, the first three digits of the longitude value indicate the degrees, up to a maximum value of one hundred and eighty (180); with the east/west flag changing that value from +180 to −180. The next two digits of the longitude value indicate the minutes, with the digits after the decimal indicating seconds (mapping to a resolution of 1000, such that every additional 16.667=1 second). The north/south and east/west reference information can be encoded as bit flags, occupying two (2) bits overall.

Fifty (50) bits of the 64-bit suffix may be used to encode the longitudinal and latitudinal information. The encoding process may be done as follows. The latitude and longitude degree values are represented as 8-bit values (since they cannot exceed one hundred and eighty (180)) and these bit values are interpolated to form the most significant sixteen (16) bits of the encoding. Next, the latitude and longitude minute values are represented as 6-bit values (since they cannot exceed sixty (60)) and these bit values are interpolated and copied over as the next twelve (12) bits of the 64-bit suffix. The latitude and longitude seconds values are provided as a 3-digit number, with each increment of 16.667 representing an additional second. To represent this 3-digit number, ten (10) bits are used respectively for the latitude and longitude seconds values. The north/south and east/west reference information is encoded using two (2) bits. Based on the foregoing, it will be appreciated that the 64-bit suffix of the IPv6 address may be decoded to determine the location coordinates associated with the corresponding node.

Since the information provided by a GPS may not be sufficiently refined to distinguish the location coordinates between two neighboring nodes, additional bits in the 64-bit suffix of the IPv6 address may be used to provide the distinction. For example, fifty (50) bits may be used for location encoding, six (6) bits may be used as node ID to distinguish between two neighboring nodes with similar location coordinates, with the remaining eight (8) bits from the 64-bit suffix used as a host identifier. The binary representation of the 64-bit suffix using the foregoing scheme is shown in FIG. 4.

A source node necessarily has knowledge of the node address 24 of a destination node in order for the source node to transmit information to the destination node. Typically, when the source node originates a new packet addressed to the destination node, the source node places in the header of the packet an explicit source route. The source route provides information on the sequence of hops (nodes) that the packet is to follow on its way to the destination node. Normally, the source node obtains the suitable source route by examining its route cache 22 which contains previously learned routing information. If no suitable route is found, the source node may initiate a route discovery process to find a viable route to the destination node. As will be further described below, the node address 24 of the destination node may be used to optimize the route discovery process.

Figure 5A:
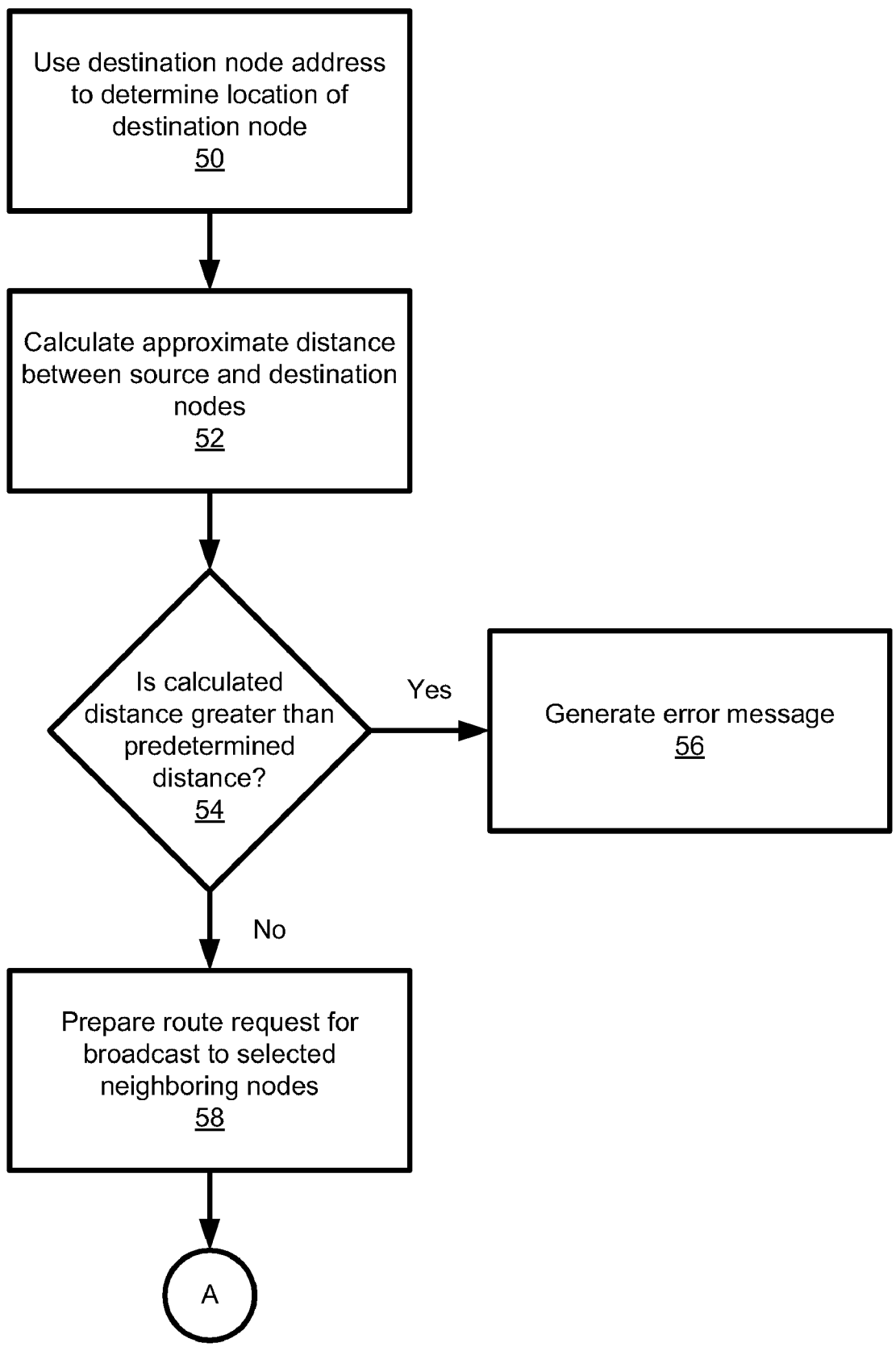
FIGS. 5A-B are flow diagrams illustrating the operations of the route discovery process according to one embodiment of the present invention.
Figure 5B:
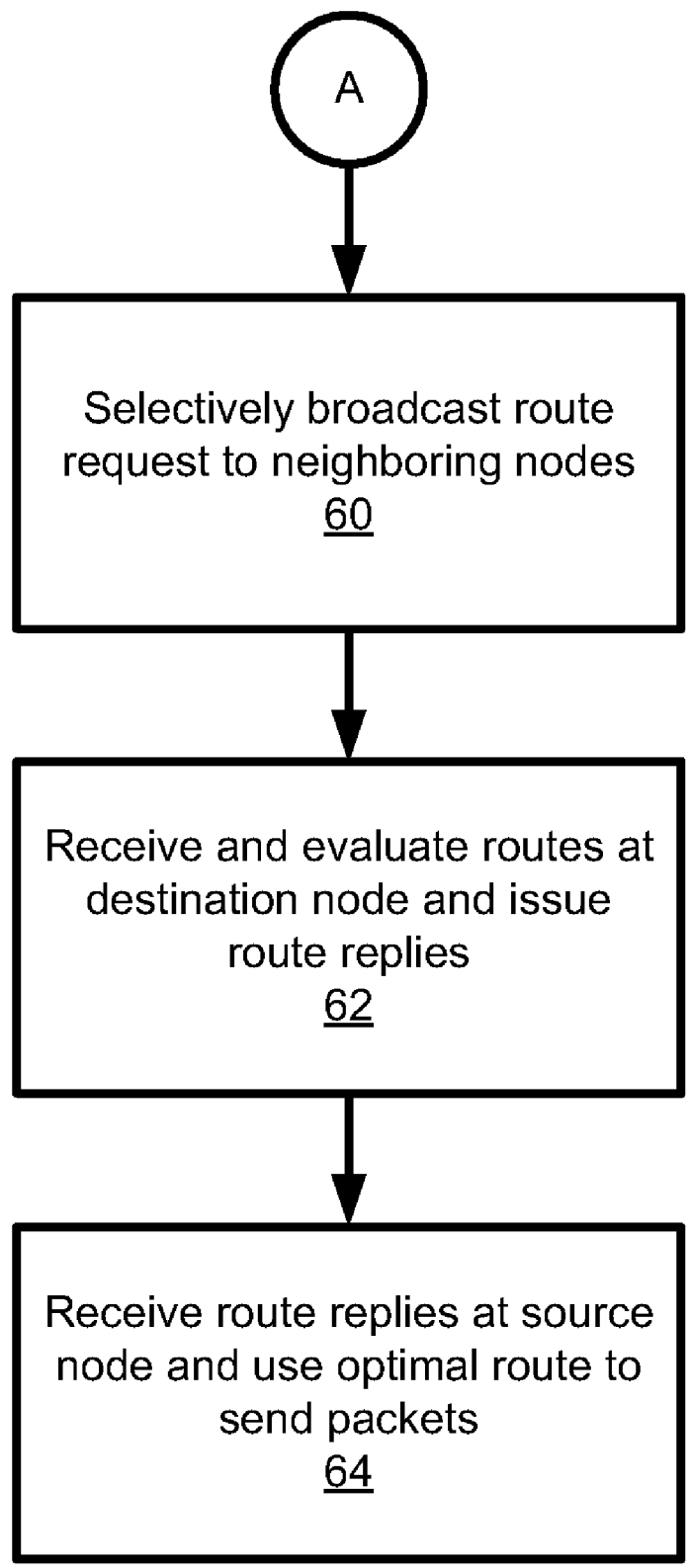

FIGS. 5A-B illustrate the operation of the route discovery process. At block 50 in FIG. 5A, based on the node address 24 of the destination node, the source node is able to determine the general direction of the destination node. As described above, the node address 24 is an IPv6 address that has a 64-bit suffix. The 64-bit suffix can be decoded to determine the location information of the destination node. At block 52, the approximate distance between the source node and the destination node is calculated using the location information derived from the respective node addresses. At block 54, the calculated distance is then compared against a predetermined maximum allowable transmission distance. The predetermined maximum allowable transmission distance may be determined based on the specific design and/or constraints of the network 10 and the nodes 12a-j, for example the Quality of Service (QoS) of the desired connection. Based on the disclosure and teachings provided herein, a person of ordinary skill in the art will appreciate how to arrive at the predetermined maximum allowable transmission distance. If the calculated distance is larger than a predetermined maximum allowable transmission distance, then at block 56 an error message is generated by the routing logic 20 to indicate that the destination node is out of transmission range. If the calculated distance is less than or equal to the predetermined maximum allowable transmission distance, then at block 58 the source node prepares a route request for broadcast to selected neighboring nodes.

At block 60 in FIG. 5B, to minimize wasteful broadcast of the route request to all neighboring nodes, the source node examines the respective node addresses of its neighboring nodes to determine which of those neighboring nodes should be used initially to try to reach the destination node. As mentioned above, location information relative to a node may be derived from its corresponding node address. Consequently, neighboring nodes that are in the general direction of the destination node may be determined and selected to receive the route request. The foregoing selection is made on the basis that, on average, neighboring nodes that are not in the general direction are less likely to provide the optimal route to the destination node. Using FIG. 1 for illustration, assume that node B 12b is the source node and wishes to transmit data to a destination node, node C 12g. Node B 12b may choose to ignore node A 12a and selectively broadcast a route request to nodes C, D and E 12c-e, because these latter nodes are in the general direction of node G 12g, whereas, node A 12a is in the opposite direction. It should be noted that neighboring nodes that are in the general direction of the destination node may not necessarily provide a viable or the optimal route to the destination node. Again, referring to FIG. 1 for illustration, node D 12d is not able to provide a viable route to node C 12g at all because of the obstruction 16. As a result, the source node may compare the discovered routes against certain predetermined criteria to determine if such routes are acceptable. The predetermined criteria may include, for example, the number of hops along the route and/or the maximum available bandwidth or QoS (quality of service). If none of the initially selected neighboring nodes provides an acceptable route to the destination node, then the source node may choose to forward the route request to other previously non-selected neighboring nodes.

Furthermore, since selected neighboring nodes in the same general direction tire targeted to receive the route request, the source node may selectively utilize only the relevant transmission panels of the antenna 26 to transmit the route request to the intended neighboring nodes. Other transmission panels of the antenna 26 may continue to be used simultaneously for other purposes, such as, transmitting data packets to other non-selected neighboring nodes. Again, referring to FIG. 1 for illustration, node B 12b may selectively use the relevant antennas to transmit the route request to nodes C, D and E 12c-e, while concurrently continuing to use another antenna to forward data packets to node A 12a.

The route request generated by the source node identifies the source and destination nodes of the route discovery process and contains unique request identification information (including route request identification number) provided by the source node. Each copy of the route request may further contain a route record listing the addresses of each intermediate node through which this particular copy of the route request has been forwarded. The route record is initialized to a one-item list identifying the source node as the first item on the list. The route request may also include route capacity or service requirements, such as, bandwidth and/or QoS requirements. The route capacity or service requirements are for any route to be used between the source and destination nodes. Such requirements may be specified as a minimum or a range. For example, the bandwidth may be specified as a minimum of 10 mbps or 10 mbps ±10%.

The route request may be bounded by the source node by specifying a geographic area to which the route request is to be confined. The specified geographic area may be encoded in the net mask. The specified geographic area may be represented by maximum and minimum values of the longitudinal and latitudinal information that an intermediate node needs to fall within in order for the intermediate node to process the route request. The maximum and minimum values of the longitudinal and latitudinal information may be initially based on the distance between the source node and the intermediate node. Such maximum and minimum values may be adjusted, as will be further described below.

When an intermediate node receives a route request, the intermediate node performs a number of tasks. For example, the intermediate node may first decode the route request to ascertain that the intermediate node is geographically located within the specified geographic confines. If it is determined that the intermediate node is located within the specified geographic confines, then the intermediate node will further process the route request; otherwise, the intermediate node will discard the route request.

Next, if the intermediate node receiving the route request sees its own node address already listed in the associated route record, then the intermediate node will also discard the route request.

Then, the intermediate node evaluates the route capacity or service requirements of the route in question to determine if it can participate in the route. If the intermediate node can minimally satisfy these requirements (i.e., the intermediate node can participate in the route), the intermediate node will process and forward the route request to one or more of its neighboring nodes for further delivery to the destination node; otherwise, the intermediate node will discard the route request. The forwarding process performed by the intermediate node is similar to how the source node initially issued its route request. In other words, the intermediate node may also selectively broadcast copies of the route request to one or more neighboring nodes.

In processing the route request, the intermediate node performs a number of actions including, for example, appending its own node address to the route record in the route request, incrementing the hop count, specifying the route capacity or service capacity that it can dedicate towards the particular route, and propagating the route request as a local broadcast packet (with the same request identification number) to its neighboring node(s).

The intermediate node reserves the appropriate resources to satisfy the route capacity or service requirements that have been specified in the propagated route request. The reserved resources are released for other usage when one of the following conditions occurs: the intermediate node receives a reject route reply from the destination node which confirms that the intermediate node will not be participating in the specified route, or a reservation timer associated with the intermediate node times out thereby invalidating the capacity or service level guaranteed to the propagated route request.

It should be noted that an intermediate node may be part of one or more routes between the source node and the destination node.

Again in FIG. 5B at block 62, when the route request reaches the destination node, the destination node performs a number of actions. For example, after the first route request reaches the destination node, the destination node will wait for a predetermined time period before it starts replying to all route request(s) from the same source node. This is performed to reasonably ensure that most, if not all, of the route request (s) from the same source node are received. The predetermined time period is dependent on the estimated time it will take for route request(s) to arrive from the source node. The predetermined time period may be calculated based on one or more factors including, for example, the number of estimated hops, source address etc. Based on the disclosure and teachings provided herein, a person of ordinary skill in the art will appreciate how to calculate this predetermined time period according to the present invention.

Each route request with the same request identification number and from the same source node that has a different/unique route record will be entered into the route cache 22 of the destination node. Additional route requests with the same request identification number, source node and route records are considered duplicates and are discarded. Each unique route request which results in an entry in the route cache 22 of the destination node triggers an automatic route reply by the destination node. The route reply contains the route cache entry number field for the corresponding unique source route and the route record itself. As will be further described below, there are two types of route reply, namely, a route accept reply and a route reject reply.

The destination node selects the optimal route from the route cache 22 that best satisfies the route capacity or service requirements specified by the source node. The selection may be performed based on a number of factors including, for example, number of hops on the route or maximum available bandwidth, etc. The destination node then sends a route accept reply down the selected optimal route; for all other routes between the source and destination nodes, the destination node forwards a route reject reply. As described above, the accept route reply signals to the intermediate node(s) along the selected optimal route that those intermediate node (s) will participate in the selected optimal route, and the route reject reply signals to other intermediate node(s) that they will no longer be needed thereby releasing any reserved resources.

All route replies are then forwarded by the destination node to the source node based on routes formed by reversing the sequence of hops identified in the respective route records. The foregoing route reversal is performed to test the discovered routes to ensure such routes are bi-directional between the source and destination nodes. The route reversal also avoids the overhead of a possible second unnecessary route discovery.

After broadcasting a route request, the source node waits for one or more route replies. At block 64, once the route replies are received by the source node, the source node then forwards its packets to the destination node using the selected optimal route.

If a route reply is not received within a predetermined time period, then the source node may reattempt to discover a route by broadcasting another route request. The source node may re-issue route request(s) up to a predetermined maximum number of attempts. The predetermined expiration period and the number of attempts may vary depending on system designs and/or constraints. Each re-issued route request includes an incremented route request identification number. The incremented route request identification number is used to distinguish the re-issued route request from the previous route request. Furthermore, for each re-issued route request, the TTL (time-to-live) field of the IP header and the latitude and longitude fields representing the specified geographic confines are also incremented. The TTL field is increased to ensure that additional time is provided for the re-issued route request to discover a route. As will be further described below, the latitude and longitude fields are adjusted so that the re-issued route request may be disseminated to nodes that are located at a farther distance from the previous request.

The geographic confines of the route request may be determined as follows:

$$\min\nolimits_{Latitude} = \min(Latitude_{source}, Latitude_{destination}) - Ring_{Delta}$$

$$\max\nolimits_{Latitude} = \max(Latitude_{source}, Latitude_{destination}) + Ring_{Delta}$$

$$\min\nolimits_{Longitude} = \min(Longitude_{source}, Longitude_{destination}) - Ring_{Delta}$$

$$\max\nolimits_{Longitude} = \max(Longitude_{source}, Longitude_{destination}) + Ring_{Delta}$$

The initial value of the geographical scale factor, $Ring_{Delta}$, is the distance between the source and destination nodes. Each re-issued route request will increment the $Ring_{Delta}$ by an adjustable increment, such as two (2), until either a viable route is discovered or the maximum number of attempts is reached, whichever happens first.

When initiating a route discovery process, the source node saves a copy of the original packet (that triggered the route discovery process) in a local buffer (not shown) called the "Send Buffer" The Send Buffer contains a copy of each packet that cannot be transmitted by the source node due to the lack of a viable route to the packet's destination. Each packet in the Send Buffer is logically associated with the time that such packet was placed into the Send Buffer and is discarded after residing in the Send Buffer for a predetermined time-out period. If appropriate, in order to prevent the Send Buffer from overflowing, a FIFO (first-in-first-out) or other replacement strategy may be used to evict packets from the Send Buffer before the associated time-out period of a packet has expired. When a packet remains in the Send Buffer, the source node may occasionally initiate a new route discovery process for the packet's destination. The source node, however, may limit the rate at which a new route discovery process for the same address is initiated.

In order to reduce the overhead from such route discovery processes, a source node may use an exponential back-off algorithm to limit the rate at which the source node initiates a new route discovery process for the same destination, whereby, for example, the time-out periods between two successive route request for route discovery process for the same destination are doubled. If the source node attempts to send additional packets to the same destination node more frequently than the limited rate, the subsequent packets may be buffered in the Send Buffer until a route reply is received providing a route to the destination node.

Each route request may also contain a "hop limit" that is used to limit the number of intermediate nodes that are allowed to forward a copy of that route request. This hop limit may be implemented using the TTL field in the IP header of the packet carrying the route request. As the route request is forwarded, this hop limit is decremented, and the route request is discarded if the hop limit reaches "zero" before arriving at the destination node. This hop limit is used along with the geographic confines to control the spread or dissemination of a route request during a route discovery process.

When originating or forwarding a packet using a discovered route, each intermediate node transmitting the packet is responsible for confirming that the packet can flow over the link or connection from that intermediate node to the next hop or node. This is based on acknowledgements provided by the MAC (Medium Access Control) layer of the next node. If no acknowledgement is received for a predetermined time interval, then the intermediate node treats the link to the next hop as currently unusable. The intermediate nodes also remove this link from their routing cache and return a route error message to each node that has sent a packet routed over that link since the last received acknowledgement. The route error messages are propagated back to the source and destination nodes, assuming that the nodes on either side of the unusable link detect the fault, using the route of the last received packet along this flow. Hence, both the source and destination nodes will be receiving route error messages. Subsequently, the source node will attempt to find an alternate route based on the route discovery process described above.

Occasionally the link between two (2) nodes participating in a particular flow or route could degrade to such an extent that they can no longer provide the bandwidth or level of QoS that was initially guaranteed during the route discovery process. In such a case, if the available bandwidth or level of QoS for that link falls below the minimum specified by the route discovery process, a receiving node will initiate a route error message to the source of the next packet that is to be received. The route error message may indicate the link quality degradation.

When a destination node is at a distance greater than the maximum permitted distance for a direct node connection, backhaul routers (such as, router 22A shown in FIG. 1) may be used to route packets to the destination node. A backhaul router may be viewed as a gateway which provides access to other networks or devices (such as external network 20A). These other networks or devices may include, for example, an Internet service provider (ISP), a wired network (such as, the Internet), and a wireless network (such as, a cellular telecommunication network). When a source node concludes that the distance to the destination node is beyond the maximum permitted distance, the source node may look up its neighboring routers list, select the nearest router and use the selected router to backhaul its packet(s) destined for the destination node. This is done by setting the backhaul router address next to the destination address in the route record of the route request. The source node may then route the packet (s) to a source backhaul router which, in turn, will forward the route request to the appropriate destination backhaul router based on the location mappings. The source backhaul router does not cache the route information to the source node in its route cache, since the packet(s) will be routed end to end. This helps in lowering the route cache requirements (and the route lookup times) in the backhaul routers. The destination backhaul router may then propagate the route request in the geographic area that it serves. Such geographic area is likely to include the destination node. The route reply from the destination node is similarly propagated back from the destination backhaul router to the source backhaul router and ultimately to the source node. Referring to FIG. 1 as an illustration, source node I 12*i* wishes to send a packet to destination node K 12*k*. However, the destination node K 12*k* is determined to be beyond the maximum permitted distance for a node connection within the network 10. Then, source node I 12*i* looks up the nearest router 22A and then forwards a route request to the router 22A for delivery to destination node K 12*k*. The router 22A may deliver the route request via the external network 20A.

For redundancy purposes, the route records may include at least two (2) routes that may used to reach each router. These routers will provide long distance backhaul facilities and/or Internet (ISP) access, depending upon the services subscribed to by the end terminal. A backhaul/ISP router may periodically advertise its presence and capabilities by issuing a bounded router advertisement message. The advertisement message may define the geographic area that will be served by the router as well as the facilities (ISP, backhaul, etc.) that such router will provide. Each advertisement message may further include a sequence number, which will be incremented by the router every time the router sends out a new advertisement message.

When a node receives the advertisement message, the node only processes such message if the node is located within the geographic area specified by the advertisement message. The processing decision can be controlled by the net mask. The node processes the advertisement message as follows. If the sequence number of the advertisement message received from the router is greater than the last known sequence number associated with this router, the node will update the entry for this router in the neighboring routers list. The node will also compare the route record in this copy of the advertisement message against the stored route record associated with that router. If the source record in the advertisement message indicates a shorter route to the router, the node will then update the stored route record associated with that router. The node may further propagate the advertisement message to all other nodes that are within its specified geographic confines. To avoid redundant advertisement messages, the node may not re-broadcast the advertisement message into the same geographic area where the node received the advertisement message. Furthermore, the node may not re-broadcast the same advertisement message (as uniquely identified by the sequence number) more than once. Each intermediate node will add its own address into the route record of the advertisement message and increment the associated hop count before propagating the advertisement message to other nodes.

When a new node comes up, the new node may solicit information about neighboring routers by broadcasting a router solicitation message into the specified geographic area associated with the new node. The solicitation message may not be propagated beyond the specified geographic area as determined by the net mask. Each router within the geographic area may respond to the solicitation message by replying with a gratuitous router advertisement message to the requesting node. This gratuitous router advertisement message may include the capabilities, the geographic confines of the service area of the router and the route(s) to reach the router.

The following is an illustration of how a route is discovered. Referring to FIG. 1, node B 12b wishes to forward its packets to node G 12g. In this case, the node address of node G is known to node B. The node address of node G may be obtained in a number of ways. A person skilled in the art would know how to determine the node address using one or more well known methods. In order to determine the optimal route to node G 12g, node B 12b determines the general location and/or direction of node G 12g based on the node address of node G 12g. Based on this determination, node B 12b selectively issues a route request to nodes C, D and E 12c-e, but not node A 12a. Nodes C, D and E 12c-e are selected to receive the route request because these nodes are located in the general direction of node G 12g. Nodes C, D and E 12c-e then examine their respective route requests and determine if they can participate in a route to node G 12g and satisfy the route requirements, such as, capacity and/or quality of service requirements. If a node determines that it cannot satisfy the route requirements, then it discards the route request. In this illustration, node D 12d determines that it cannot reach node G 12g due to the obstruction 16. As a result, node D 12d drops the route request. Assuming that nodes C and E 12c,e are able to satisfy the route requirements, they then selectively issue copies of the route request to some of their neighboring nodes, such as, nodes F and J 12f,j. Route requests ultimately reach node G 12g.

It should be noted that, in this illustration, the route request issued by node B 12b includes a specified geographic area 18. The specified geographic area 18 is determined by the longitudinal and latitudinal information of nodes B and G 12b,g and a predetermined factor. Consequently, nodes located outside of the specified geographic area 18, such as, nodes H and I 12h,i, do not process the route request.

Upon node G 12g receiving the route requests, node G 12g selects the optimal route. In this illustration, the optimal route is presumed to be the route having nodes A, C, J and G 12a,c,j,g. A route accept reply is then sent along the optimal route to node B 12b. Upon receiving the route accept reply, nodes C and J 12c,j assign the resources they had previously reserved upon receiving the route request in order to guarantee the service. Once node B 12b receives the route accept reply, node B 12b then begins forwarding packets to node G 12g using the optimal route represented by the route accept reply. A route reject reply is also sent along the other route having nodes B, E, F and G 12b,e,f,g. Upon receiving the route reject reply, nodes E and F 12e,f then release their previously reserved resources. If the route reject or accept is not received within a predetermined interval, then the reserved resources are released.

In an alternative illustration, if no viable route is identified within the specified geographic area 18 (e.g., if both nodes F and J 12f,j are unavailable), then node B 12b may re-issue a new route request. The new route request may expand the specified geographic area 18 to include nodes H and I 12h,i. Nodes H and I 12h,i may then be identified as possible routes to node G 12g. A similar selection process may then be performed to identify the optimal route.

In a further optimization of the above disclosed method, a node may also use previously cached routes that have been used to reach the destination node (node G 12g in the illustrative example) to request a more direct route and to accelerate the route discovery process. Any node along the path of the route request may use this optimization. Of course, this could be the source node (e.g., node B 12b) that performs this optimized step, thereby avoiding broadcast of route requests to other nodes in the chain.

Although the foregoing routing scheme has been described with reference to the stationary nodes A-J 12a-j, it should be understood that the scheme could also be applied to mobile units (such as mobile units 14a-c) that are associated with a stationary node. Each of the mobile units 14a-c may be treated as a mobile node. For example, node A 12a may be assigned to handle the mobile units 14a-c. The node addresses of the mobile nodes 14a-c may be derivatives of the node address of node A 12a. As a result, node addresses for the mobile units 14a-c are also geographically based. Thus, a mobile unit may act as a source node and forward a route request to a destination mobile unit via a stationary node associated with that destination mobile unit. The destination mobile unit and the corresponding stationary node may communicate with each other to facilitate establishing a connection. This could be further optimized with the stationary node making all the route decisions and only forwarding user packet data onto the associated mobile node, thereby reducing the processing load on the mobile unit and further improving performance. Based on the disclosure and teachings provided herein, other enhancements to the foregoing routing scheme may be made by those ordinarily skilled in the art.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, DVD or any other form of storage medium known in the art. A storage medium may be coupled to the processor such that the processor can read information from, and write information to, the storage medium. In the alternative, the storage medium may be integral to the processor.

The previous description of the disclosed embodiments is provided for purposes of illustration and description to enable any person skilled in the art to make or use the present invention. It is not intended to be exhaustive or to limit the invention to the precise form disclosed. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more"All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for identifying an optimal route in a network, comprising:
   a destination node having an associated node address;
   a source node having an associated node address; and
   a plurality of intermediate nodes each having an associated node address, the plurality of intermediate nodes including a plurality of neighboring nodes associated with the source node;
   wherein the node addresses associated respectively with the destination node and the plurality of intermediate nodes include location information associated respectively with the destination node and the plurality of intermediate nodes;
   wherein the source node is configured to select one or more of the plurality of neighboring nodes to receive a route request, the selection of the selected one or more neighboring nodes being based on the location information associated with the destination node and the selected one or more neighboring nodes;
   wherein one or more of the selected one or more neighboring nodes propagate their route requests received from the source node to the destination node along one or more routes, each of the one or more routes including one or more of the plurality of intermediate nodes; and
   wherein the destination node is configured to:
      receive the route requests propagated by one or more of the selected one or more neighboring nodes, the route requests respectively identifying the one or more routes; and
      select the optimal route from the one or more routes based on the received route requests.

2. The system of claim 1 wherein the node addresses respectively associated with the destination node, the source node and the plurality of intermediate nodes are based on Ipv6 (Internet Protocol version 6).

3. The system of claim 1 wherein the location information associated respectively with the destination node and the plurality of intermediate nodes includes longitudinal and latitudinal information that can be used to derive corresponding geographical locations of the destination node and the plurality of intermediate nodes.

4. The system of claim 3 wherein the corresponding geographical locations of the selected one or more neighboring nodes and the destination node are used by the source node to make the selection.

5. The system of claim 4 wherein the selected one or more neighboring nodes are geographically located in the direction of the destination node.

6. The system of claim 1 wherein the source node is further configured to communicate with one or more of the plurality of neighboring nodes that are not selected to receive a route request while the route request is being forwarded to the selected one or more neighboring nodes.

7. The system of claim 1 wherein the source node further includes a transceiver having a plurality of transmission antennas;
   wherein one or more of the plurality of transmission antennas are selectively used to forward the route request to the selected one or more neighboring nodes; and
   wherein the one or more of the plurality of transmission antennas are respectively aimed in the direction of the selected one or more neighboring nodes.

8. The system of claim 7 wherein the plurality of transmission antennas are formed from a plurality of antenna panels.

9. The system of claim 7 wherein the plurality of transmission antennas are formed from a plurality of parasitic elements.

10. The system of claim 7 wherein the source node and the plurality of neighboring nodes are configured to communicate with each other via radio frequencies.

11. The system of claim 1 wherein the route request includes route requirements; and
    wherein the one or more of the plurality of intermediate nodes included in each of the one or more routes are able to satisfy the route requirements.

12. The system of claim 11 wherein the route requirements include at least one of a bandwidth requirement and a quality of service requirement.

13. The system of claim 11 wherein the route requirements are specified either as a minimum or a range.

14. The system of claim 11 wherein the optimal route is selected based on one or more of a plurality of factors including a number of intermediate nodes traversed and an amount of resources that are available to satisfy the route requirements.

15. The system of claim 1 wherein the node address associated with the source node includes location information associated with the source node; and
    wherein the selection of the selected one or more neighboring nodes is further based on specified geographic confines, wherein the specified geographic confines are derived based on the location information of the source and destination nodes and are adjustable.

16. The system of claim 15 wherein the selected one or more neighboring nodes are located within the specified geographic confines.

17. The system of claim 1 wherein the source node and the plurality of intermediate nodes are configured to cache route data and use the route data to optimize route selection to the destination node.

18. The system of claim 1 wherein the source node and the destination node include mobile devices.

19. The system of claim 1 wherein the plurality of intermediate nodes includes at least a router configured to provide an alternative connection to the destination node.

20. The system of claim 19 wherein the alternative connection includes an external network.

21. The system of claim 1 wherein the one or more of the selected one or more neighboring nodes are configured to select zero, one or more of its plurality of neighboring nodes to receive the propagated route request.

22. The system of claim 21 wherein the selection of the selected one or more neighboring nodes by the neighboring node being based on a geographic direction to the destination node.

23. The system of claim 21 wherein the selection of the selected one or more neighboring nodes by the neighboring node being based on specified geographic confines, wherein the specified geographic confines are derived based on the location information of the selected one or more neighboring nodes and the destination node and are adjustable.

24. The system of claim 23 wherein the selected one or more neighboring nodes are located within the specified geographic confines.

25. A system for identifying an optimal route in a network, comprising:
a destination node having an associated node address;
a source node having an associated node address; and
a plurality of intermediate nodes each having an associated node address, the plurality of intermediate nodes including a plurality of neighboring nodes associated with the source node;
wherein the node addresses associated respectively with the destination node and the plurality of intermediate nodes include location information associated respectively with the destination node and the plurality of intermediate nodes;
wherein the source node is configured to select a first neighboring node and a second neighboring node from the plurality of neighboring nodes to receive a route request, the selection of the first and second neighboring nodes being based on the location information associated with the destination node and the first and second neighboring nodes;
wherein the first neighboring node propagates its route request received from the source node to the destination node along a first route, and the second neighboring node propagates its route request received from the source node the destination node along a second route, each of the first and second routes including one or more of the plurality of intermediate nodes; and
wherein the destination node is configured to:
receive the route requests propagated by the first and second neighboring nodes, the route requests respectively identifying the first and second routes; and
select the optimal route from the first and second routes based on the received route requests.

26. The system of claim 25 wherein the node addresses respectively associated with the destination node, the source node and the plurality of intermediate nodes are based on Ipv6 (Internet Protocol version 6).

27. The system of claim 25 wherein the location information associated respectively with the destination node and the plurality of intermediate nodes include longitudinal and latitudinal information that can be used to derive the corresponding geographical locations of the destination node and the plurality of intermediate nodes.

28. The system of claim 27 wherein the corresponding geographical locations of the first and second neighboring nodes and the destination node are used by the source node to make the selection.

29. The system of claim 28 wherein the first and second neighboring nodes are geographically located in the direction of the destination node.

30. The system of claim 25 wherein the source node is further configured to communicate with one or more of the plurality of neighboring nodes that are not selected to receive route request while the route request is being forwarded to the first and second neighboring nodes.

31. The system of claim 25 wherein the source node further includes a transceiver having a plurality of transmission antennas;
wherein one or more of the plurality of transmission antennas are selectively used to forward the route request to the first and second neighboring nodes; and
wherein the one or more of the plurality of transmission antennas are respectively aimed in the direction of the first and second neighboring nodes.

32. The system of claim 31 wherein the source node and the plurality of neighboring nodes are configured to communicate with each other via radio frequencies.

33. The system of claim 31 wherein the plurality of transmission antennas are formed from a plurality of antenna panels.

34. The system of claim 31 wherein the plurality of transmission antennas are formed from a plurality of parasitic elements.

35. The system of claim 25 wherein the route request includes route requirements; and
wherein the one or more of the plurality of intermediate nodes included in each of the first and second routes are able to satisfy the route requirements.

36. The system of claim 35 wherein the route requirements include at least one of a bandwidth requirement and a quality of service requirement.

37. The system of claim 35 wherein the route requirements are specified either as a minimum or a range.

38. The system of claim 35 wherein the optimal route is selected based on one or more of a plurality of factors including number of intermediate nodes traversed and amount of resources that are available to satisfy the route requirements.

39. The system of claim 25 wherein the node address associated with the source node includes location information associated with the source node; and
wherein the selection of the first and second neighboring nodes is further based on specified geographic confines, wherein the specified geographic confines are derived based on the location information of the source and destination nodes and are adjustable.

40. The system of claim 39 wherein the first and second neighboring nodes are located within the specified geographic confines.

41. The system of claim 25 wherein the source node and the plurality of intermediate nodes are configured to cache route data and use the route data to optimize route selection to the destination node.

42. The system of claim 25 wherein the source node and the destination node include mobile devices.

43. The system of claim 25 wherein the plurality of intermediate nodes includes at least a router configured to provide an alternative connection to the destination node.

44. The system of claim 43 wherein the alternative connection includes an external network.

45. The system of claim 25 wherein the one or more of the selected first and second neighboring nodes are configured to select zero, one or more of its plurality of neighboring nodes to receive the propagated route request.

46. The system of claim 45 wherein the selection of the selected first and second neighboring nodes by the neighboring node being based on a geographic direction to the destination node.

47. A method for identifying an optimal route in a network, the network having a destination node having an associated node address, a source node having an associated node address and a plurality of intermediate nodes each having an associated node address, the plurality of intermediate nodes including a plurality of neighboring nodes associated with the source node, wherein the node addresses associated respectively with the destination node and the plurality of intermediate nodes include location information associated respectively with the destination node and the plurality of intermediate nodes, the method comprising:
providing a node address associated with the destination node, the node address comprising the location information association with the destination node;

directing the source node to select one or more of the plurality of neighboring nodes to receive a route request, the selection of the selected one or more neighboring nodes being based on the location information associated with the destination node and the selected one or more neighboring nodes;

directing one or more of the selected one or more neighboring nodes to propagate their route requests received from the source node to the destination node along one or more routes, each of the one or more routes including one or more of the plurality of intermediate nodes;

and directing the destination node to receive the route requests propagated by one or more of the selected one or more neighboring nodes, the route requests respectively identifying the one or more routes, and select the optimal route from the one or more routes based on the received route requests.

48. The method of claim 47 wherein the node addresses respectively associated with the destination node, the source node and the plurality of intermediate nodes are based on Ipv6 (Internet Protocol version 6).

49. The method of claim 47 wherein the location information associated respectively with the destination node and the plurality of intermediate nodes include longitudinal and latitudinal information that can be used to derive the corresponding geographical locations of the destination node and the plurality of intermediate nodes.

50. The method of claim 49 wherein the corresponding geographical locations of the selected one or more neighboring nodes and the destination node are used by the source node to make the selection.

51. The method of claim 50 wherein the selected one or more neighboring nodes are geographically located in the direction of the destination node.

52. The method of claim 47 further comprising:
directing the source node to communicate with one or more of the plurality of neighboring nodes that are not selected to receive route request while the route request is being forwarded to the selected one or more neighboring nodes.

53. The method of claim 47 wherein the source node further includes a transceiver having a plurality of transmission antennas, the method further comprising:
directing the source node to selectively use one or more of the plurality of transmission antennas to forward the route request to the selected one or more neighboring nodes;
wherein the one or more of the plurality of transmission antennas are respectively aimed in the direction of the selected one or more neighboring nodes.

54. The method of claim 53 wherein the plurality of transmission antennas are formed from a plurality of antenna panels.

55. The method of claim 53 wherein the plurality of transmission antenna are formed from a plurality of parasitic elements.

56. The method of claim 53 further comprising:
configuring the source node and the plurality of neighboring nodes to communicate with each other via radio frequencies.

57. The method of claim 47 wherein the route request includes route requirements; and
wherein the one or more of the plurality of intermediate nodes included in each of the one or more routes are able to satisfy the route requirements.

58. The method of claim 57 wherein the route requirements include at least one of a bandwidth requirement and a quality of service requirement.

59. The method of claim 57 wherein the route requirements are specified either as a minimum or a range.

60. The method of claim 57 wherein the optimal route is selected based on one or more of a plurality of factors including number of intermediate nodes traversed and amount of resources that are available to satisfy the route requirements.

61. The method of claim 47 wherein the node address associated with the source node includes location information associated with the source node; and
wherein the selection of the selected one or more neighboring nodes is further based on specified geographic confines, wherein the specified geographic confines are derived based on the location information of the source and destination nodes and are adjustable.

62. The method of claim 61 wherein the selected one or more neighboring nodes are located within the specified geographic confines.

63. The method of claim 47 further comprising:
configuring the source node and the plurality of intermediate nodes to cache route data and use the route data to optimize route selection to the destination node.

64. The method of claim 47 wherein the source node and the destination node include mobile devices.

65. The method of claim 47 wherein the plurality of intermediate nodes includes at least a router configured to provide an alternative connection to the destination node.

66. The method of claim 65 wherein the alternative connection includes an external network.

67. The method of claim 47 wherein the one or more of the selected one or more neighboring nodes are configured to select zero, one or more of its plurality of neighboring nodes to receive the propagated route request.

68. The method of claim 67 wherein the selection of the selected one or more neighboring nodes by the neighboring node being based on a geographic direction to the destination node.

69. The method of claim 67 wherein the selection of the selected one or more neighboring nodes by the neighboring node being based on specified geographic confines, wherein the specified geographic confines are derived based on the location information of the selected one or more neighboring nodes and the destination node and are adjustable.

70. The method of claim 69 wherein the selected one or more neighboring nodes are located within the specified geographic confines.

71. A node for use in identifying an optimal route in a network, the node comprising:
a node address comprising location information associated with the node;
wherein the node is configured to operate in a source mode, a neighboring mode and a destination mode;
wherein, in the source mode, the node is configured to select one or more of a plurality of neighboring nodes to receive a route request, the selection of the selected one or more neighboring nodes being based on location information associated with a destination node and the neighboring nodes;
wherein, in the neighboring mode, the node is configured to selectively propagate a received route request by selecting zero, one or more of the plurality of neighboring nodes to receive the received route request, the selection of the selected neighboring nodes being based on the location information associated with a destination node and the neighboring nodes; and wherein, in the destination mode, the node is configured to:
receive one or more route requests propagated by a respective one or more neighboring nodes, each route request identifying a respective route; and
select the optimal route from the one or more routes based on the received route requests.

72. The node of claim 71 further comprising:
a transceiver having a plurality of transmission antennas;
wherein one or more of the plurality of transmission antennas are selectively used to forward the new route request to the selected one or more neighboring nodes; and
wherein the one or more of the plurality of transmission antennas are respectively pointed in the direction of the selected one or more neighboring nodes.

73. The node of claim 71 wherein, in the source mode and the neighboring mode, the selected one or more of the plurality of neighboring nodes being based on a geographic direction from the node to the destination node.

74. The node of claim 71 wherein, in the source mode and the neighboring mode, the node is further configured to communicate with one or more of the plurality of neighboring nodes that are not selected to receive the route request while the route request is being forwarded to the selected one or more neighboring nodes.

75. The node of claim 71 wherein the selection of the selected one or more neighboring nodes in the source mode and the neighboring mode is further based on specified geographic confines, wherein the specified geographic confines are derived based on the location information of the node and the destination node and are adjustable.

76. The node of claim 75 wherein the selected one or more neighboring nodes are located within the specified geographic confines.

77. The node of claim 71 wherein the node comprises a mobile device.

78. The node of claim 71 wherein the plurality of intermediate nodes includes at least a router configured to provide an alternative connection to the destination node.

79. The node of claim 78 wherein the alternative connection includes an external network.

80. The node of claim 71 wherein the selected one or more of the plurality of neighboring nodes comprises a selected plurality of neighboring nodes.

81. A method for identifying optimal routes in a network, the network having a plurality of nodes each having an associated node address identifying a geographic location, the method comprising, at a node:
providing a node address associated with the node, the node address comprising the location information associated with the node;
selecting one or more of a plurality of neighboring nodes to receive a new route request comprising a destination node, the act of selecting based on location information associated with the destination node and the plurality of neighboring nodes;
selectively propagating a received route request by selecting zero, one or more of the plurality of neighboring nodes to receive the received route request, the act of selecting based on the location information associated with a destination node and the plurality of neighboring nodes; and
receiving one or more route requests identifying the node as a destination node and propagated by a respective one or more of the plurality of neighboring nodes, each route request identifying a respective route; and
selecting an optimal route from the one or more routes based on the received route requests identifying the node as the destination node.

82. The method of claim 81 further comprising, at a node:
sending the new route request message to the selected one or more of a plurality of neighboring nodes;
timing out waiting for an acknowledgement of a destination node receiving the new route request; and
selecting, in response to timing out, one or more additional neighboring nodes to receive the new route request.

83. The method of claim 81 further comprising:
selecting one or more of a plurality of transmission antennas to transmit the route request to the selected one or more of a plurality of neighboring nodes based on a location of the selected one or more of a plurality of neighboring nodes;
wherein the one or more of the plurality of transmission antennas are respectively pointed in the direction of the selected one or more neighboring nodes.

84. The method of claim 81 wherein the act of selecting the one or more of the plurality of neighboring nodes and the act of selectively propagating are based on specified geographic confines, wherein the specified geographic confines are derived based on the location information of the node and the destination node and are adjustable.

85. The method of claim 84 wherein the selected one or more neighboring nodes are located within the specified geographic confines.

86. The node of claim 81 further comprising selecting a router configured to provide an alternative connection to the destination node.

87. The method of claim 86 wherein the alternative connection includes an external network.

88. The method of claim 81 wherein the act of selecting the one or more of the plurality neighboring nodes is based on a geographic direction from the node to the destination node, and wherein the act of selectively propagating the received route request is based on a geographic direction from the node to the destination node.

89. The method of claim 81 wherein the act of selecting the one or more of the plurality neighboring nodes comprises selecting a plurality of neighboring nodes, and wherein the act of selectively propagating the received route request comprises selecting a plurality of neighboring nodes.

* * * * *